Aug. 13, 1968  C. G. DELFORCE ET AL  3,397,016
BEARING UNITS

Filed April 5, 1966  3 Sheets-Sheet 1

INVENTORS: CEDRIC G. DELFORCE
GERALD L. DONNELLAN
BY:
BARNARD, Mc GLYNN & REISING

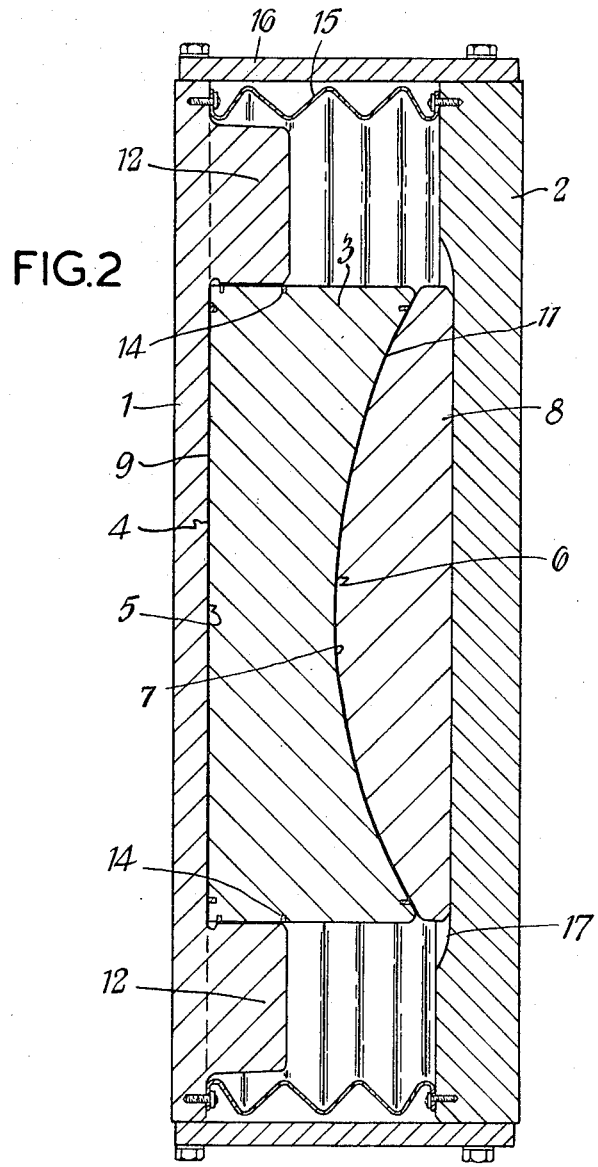

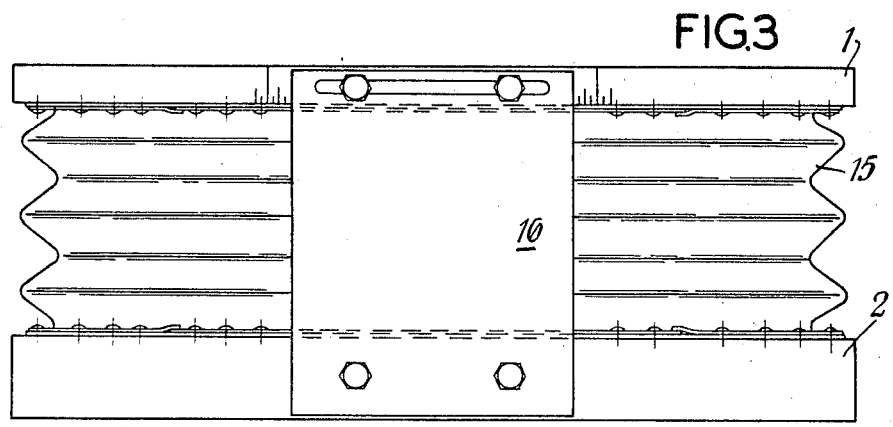

United States Patent Office 3,397,016
Patented Aug. 13, 1968

3,397,016
BEARING UNITS
Cedric George Delforce, Clevedon, Somerset, and Gerald Lowe Donnellan, Yatton, near Bristol, Somerset, England, assignors, by mesne assignments, to Lear Siegler, Inc., Santa Monica, Calif., a corporation of Delaware
Filed Apr. 5, 1966, Ser. No. 540,345
Claims priority, application Great Britain, Apr. 8, 1965, 15,040/65
3 Claims. (Cl. 308—3)

ABSTRACT OF THE DISCLOSURE

A structural bearing unit including a first plate having a flat bearing surface, a second plate, a pad having a flat bearing surface in sliding contact with the flat bearing surface on the first plate member, a block extending from the second plate, the pad and the block having coacting spherical bearing surfaces, lugs disposed on opposite sides of the pad and extending from the first plate and presenting oppositely disposed parallel planar surfaces coacting with oppositely disposed parallel planar surfaces on the pad to limit relative sliding movement between the first plate and the pad to sliding movement in a plane which is transverse to the first plate.

---

Figure 1:
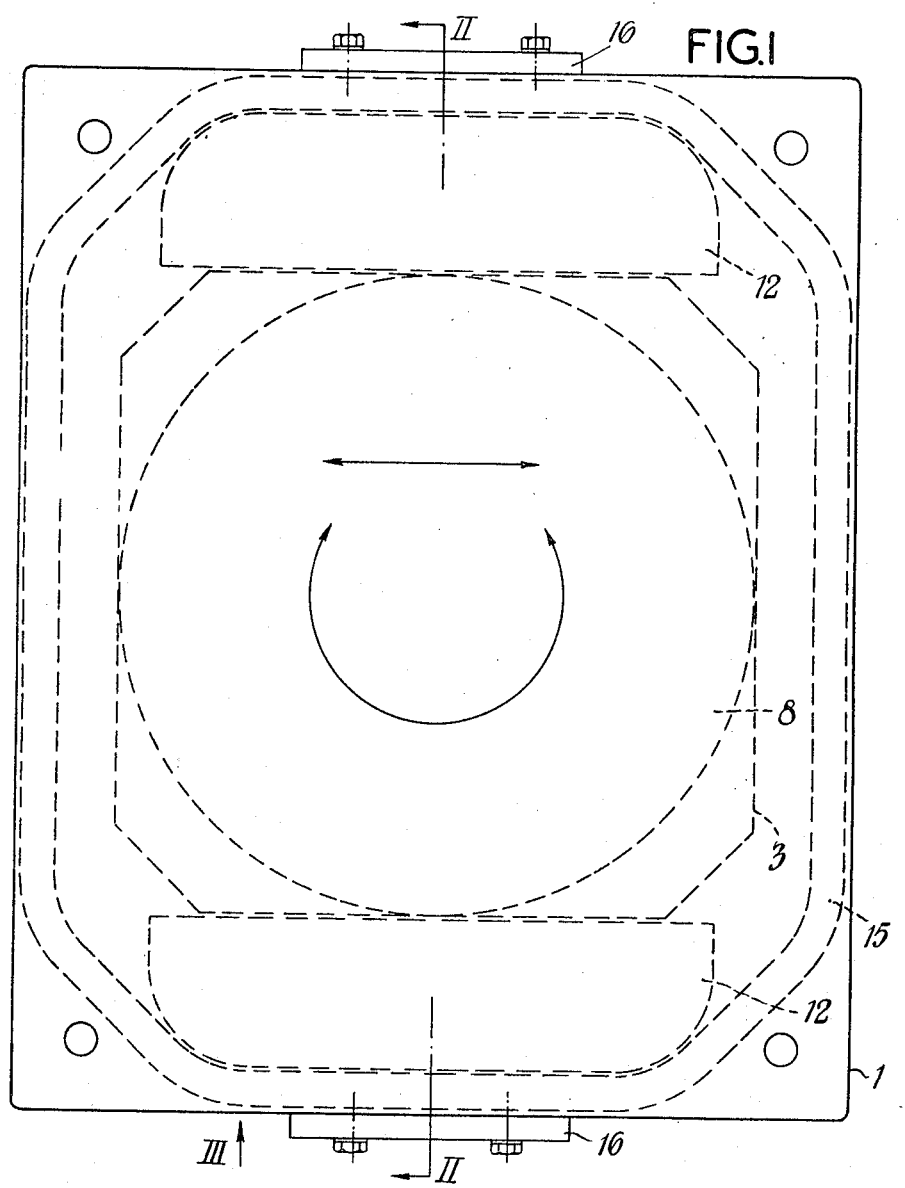

In order that the invention may be more fully understood, one construction of bearing unit in accordance with the invention will now be described, by way of example with reference to the accompanying drawings, in which, FIGURE 1 shows a plan of the unit, FIGURE 2 shows a section taken along the line II—II in FIGURE 1, and FIGURE 3 shows an end view taken in the direction of the arrow III in FIGURE 1.

Referring to the drawings, the unit incorporates two outer plate members 1 and 2 which are separated by an interposed floating pad member 3. In use of the bearing unit, the upper plate member may form a load receiving member and the lower plate member then conveniently forms a support member.

In order to allow for both relative parallel and relative angular movement between the outer plate members, the upper plate member has a flat bearing surface 4 against which a corresponding flat bearing surface 5 of the pad member seats. The lower plate member supports a block 8 having a domed part-spherical surface 6 which seats against a correspondingly recessed bearing surface 7 on the pad member. Although the domed surface may be formed on the lower plate member itself, conveniently, and as shown, the lower plate is of two-part construction comprising a plate and the block 8 which is itself domed and which is secured to the plate.

The upper plate member 1 is, in the construction described, a stainless steel casting and the pad member is of corrosion resistant cast-iron, whilst the block 8 is of stainless steel and the underlying plate of low carbon steel. The bearing surfaces 4 and 6 may be provided with coverings 9 and 11 respectively of the material known under the name Fiberglide or in fact with any low friction bearing material composed of or incorporating knitted or woven fibres e.g. polytetrafluoroethylene (such as the material known under the name Teflon), nylon, courtelle or terylene. Alternatively such coverings may be applied to the flat and concave surfaces 5 and 7 on the pad member 3.

It will be realised that the provision of the pad member 3 with its opposed flat and part-spherical surfaces 5 and 7 enables the plate members 1 and 2 to execute relative parallel movement and/or relative angular displacement, the angular displacement taking the form of angular movement of one of the plate members relative to the other either in the plane of the one member or in the plane perpendicular to the other member. However, in certain circumstances it may be desired to confine either the parallel or the angular movement to such movement in a single transverse plane through the outer members. To this end two lugs 12 depend from the upper plate member on opposite sides respectively of the pad member which lugs are in sliding contact with flats or oppositely disposed parallel planar surfaces formed on the side faces of the pad member. The lugs 12 present oppositely disposed parallel planar surfaces in sliding engagement with oppositely disposed parallel planar surfaces on the pad 3 to limit relative sliding movement between the plate 1 and the pad 3 to sliding movement in a plane which is perpendicular to the planar surfaces and parallel to the plate 1. Thus, in the bearing unit under consideration, it is the relative parallel movement which is confined. Conveniently for the purpose of providing flats, the pad member is of generally square shape when viewed in plan, the corners being chamfered so as to give the pad member an effective octagonal shape. This, however, is only one form of pad member and the latter may, for example, be of generally circular shape in plan and have two diametrically opposed flats machined thereon. The lugs, which are in the form of generally oblong-shaped blocks as seen in plan, extend beyond the ends of the respective flats so as to provide positive constraint for the upper plate member 1 as it slides over the pad member 3 through its normal range of anticipated movement. The lugs are shown as being formed integrally with the upper plate member but they may be separate of the plate member 1 and be secured to the plate member in any suitable fashion. For example, they may be bolted in place in which case the bolts would be in shear, or they may be secured by means of T-slots. A further alternative would be to weld the lugs into position. The sliding faces or oppositely disposed parallel planar surfaces of the pad member co-operating with the lugs may be faced or lined with coverings 13 of Fiberglide or any other suitable bearing covering material, for example, a low friction material composed of, or incorporating, synthetic fibres e.g. polytetrafluoroethylene, nylon, courtelle or terylene, which may be in the form of a woven or knitted fabric. Alternatively, the coverings may be applied to the side faces of the pad member. As a further alternative the covering material may be in the form of a moulded or rolled plastic strip of a polyamide or polypropylene suitably attached to the surface. Other examples of non-metallic bearing material which may be employed include polyamide or superpolyamide resins, condensation products of the polyisocyanates, polyester resins, polythene and fluorocarbon polymers. Whilst the lugs 12 in the particular bearing unit being described, are of stainless steel thus providing a combination of cast-iron and stainless steel at the sliding surfaces between the lugs and the pad member, the lateral faces of the pad member being optionally lined or covered, other known combinations of bearing material may be used, for example, stainless (or corrosion resistant) steel against bronze or steel against bronze. The lateral sliding surfaces on the pad member or the co-operating surfaces of the lugs may alternatively be constituted by a lining of hard wearing bearing material, the bearing material being, for instance, cast into position, rolled, friction welded, welded as a sheet, deposited as a hard surface by melting with a gas torch or plated. Suitable plated materials include nickel and chromium and deposited materials include carbides and hard chromium. It may be necessary to arrange for elimination of electro-chemical attack, and this can be done by suitable choice of bearing or backing materials, if metallic, or by insertion of Araldite or other suitable bonding agent that will act as an insulator. Any of the well known bearing metals may be employed either with or without additives or in combination with resinous material.

In order to exclude dirt, moisture or other foreign matter from the surfaces of the lugs contacted by the pad member, a groove is provided around each of the lateral bearing surfaces of the pad member and continuous flexible or elastomeric seals 14 of neoprene, ethylene propylene, polyurethane, rubber, or other suitable material are located one in each groove so as to project therefrom into sealing contact with the respective bearing surfaces of the lugs, each seal completely enclosing the bearing surfaces concerned.

The bearing unit under consideration is suitable for loads of the order of 1000 tons, but clearly units of the invention may be designed for larger or smaller loads. In one application, the bearing unit may be employed as a bridge bearing to accommodate movement between structural members of the bridge, for example, a pier and a crossing member of which one end is carried on the pier. The bearing unit can then be orientated so that change in length of the crossing member is accommodated by the permitted relative parallel movement of the plate members and that any bowing of the crossing member is accommodated by the permitted angular movement of the plate members, side loads, however, being absorbed by the lugs or stop pads. The upper plate member will in any case be free to rotate about the axis of the pad member by virtue of the co-operating convex or concave surfaces on the lower plate member and on the pad member respectively. As an alternative the lugs may be positioned to limit parallel movement of the outer members which is endwise of the crossing structural member.

In a modification, the lugs may form part of, or be secured to, the sides of the pad member and co-operate with suitably formed lateral sliding surfaces on the upper plate member. Furthermore, the stop pad means may be associated with the lower plate member and the pad member to limit relative angular movement between the two outer plate members to a single transverse plane through the plate members. In this latter case the lugs may either form part of, or be secured to, the lower plate member or form part of, or be secured to, the pad member.

The drawing also shows a flexible or elastomeric dust seal 15 provided between the facing margins of the outer plate members so as to surround the bearing surfaces and interposed pad member. There is also shown clamp plates 16 which are bolted to the plate members to maintain them in the correct relative position during transportation of the unit prior to fitting. To enable the unit to be fitted with any desired relative offset between the plate members a graduated scale is provided on the plate member 1 for co-operation with a side edge of each plate. If these plates are of metal, then they will be removed after fitting of the unit. Alternatively the plates or their bolts may be of synthetic resinous material so as to be sheared upon application of a load upon the bearing. The drawing also shows slots at 17 for the reception of a crow-bar for use in extracting the block 8 and the pad member 3. Here it should be mentioned that the block may simply be bolted to the underlying plate or be secured thereto by means of a suitable adhesive. Removal of the block and pad member is achieved by jacking up the load supported by the bearing to relieve the bearing of load whereafter, following removal of any securing bolts for the block 8, the joint between the latter and the plate is broken. Four slots 17 are normally provided.

Whilst the use of the unit of the invention in bridge constructions has been specifically referred to, the bearing unit has a wide variety of other uses as, for example, in the mounting of pipes in a refinery installation carrying hot or cold fluids, in long boilers, in other parts of processing plants, in the mounting of large machine tools and in fact in any structure where movement in longitudinal and/or rotational directions subject to the limitations imposed by the pads, is required to be accommodated between parts.

We claim:

1. A structural bearing unit comprising: a first plate having a flat bearing surface, a second plate, a pad having a flat bearing surface in sliding contact with said flat bearing surface on said first plate member, a block extending from said second plate, said pad and said block having coacting spherical bearing surfaces, lugs disposed on opposite sides of said pad and secured to said first plate, said pad presenting oppositely disposed first parallel planar surfaces, said lugs presenting oppositely disposed second parallel planar surfaces in sliding engagement with said first planar surfaces to limit relative sliding movement between said first plate and said pad to sliding movement in a plane perpendicular to said planar surfaces and parallel to said first plate.

2. A structural bearing unit as set forth in claim 1 wherein one of said first and second planar surfaces are comprised of polytetrafluoroethylene.

3. A structural bearing unit as set forth in claim 2 wherein one of said spherical bearing surfaces is comprised of polytetrafluoroethylene.

References Cited

UNITED STATES PATENTS

| | | | |
|---|---|---|---|
| 592,852 | 11/1897 | Westwood | 14—16 |
| 2,448,936 | 9/1948 | Van Zandt. | |
| 2,680,259 | 6/1954 | Milk | 14—16 |
| 3,110,474 | 11/1963 | Circle | 308—135 X |
| 3,329,472 | 7/1967 | Donnellan et al. | 308—3 |

FREDERICK L. MATTESON, JR., *Primary Examiner.*

ROBERT A. DUA, *Assistant Examiner.*